United States Patent

[11] 3,589,447

[72] Inventor David H. Seaberg
 Burlington, Iowa
[21] Appl. No. 781,725
[22] Filed Dec. 6, 1968
[45] Patented June 29, 1971
[73] Assignee J. I. Case Company
 Racine, Wis.

[54] CONTROL SYSTEM FOR DOZER
 9 Claims, 3 Drawing Figs.
[52] U.S. Cl..................................................... 172/9,
 172/10, 172/801
[51] Int. Cl....................................................... A01b
 63/112
[50] Field of Search............................................ 172/7, 9,
 10, 12, 801

[56] References Cited
 UNITED STATES PATENTS
2,921,638 1/1960 Du Shane...................... 172/9
2,964,113 12/1960 Presnell et al. ................ 172/9
3,171,496 3/1965 Nelson .......................... 172/9
3,241,620 3/1966 Brudnak........................ 172/7
3,314,484 4/1967 Bunting et al................. 172/9
3,375,876 4/1968 Engelmann.................... 172/7
3,399,733 9/1968 North............................ 172/9
3,403,736 10/1968 Kulhavy ....................... 172/9

Primary Examiner—Robert E. Pulfrey
Assistant Examiner—C. Coughenour
Attorney—Settle, Batchelder & Oltman ABSTRACT: A position- and load-sensing mechanism which is capable of automatically maintaining a tool pivotally supported on a vehicle in either a predetermined position with respect to the vehicle and/or a predetermined load on the tool. The load-sensing mechanism incorporates mounting means for pivotally supporting the pivot axis for the tool along an axis perpendicular thereto with spring means acting on the mounting means in a manner that changes in pivotal position of the mounting means indicate changes in load on the tool. The mechanism further includes an element for sensing changes from a predetermined position of the tool with respect to the vehicle and means for integrating the two signals to produce a single output signal that controls the position of a control valve which in turn selectively supplies fluid to or from fluid motor means which are adapted to raise or lower the tool on the vehicle.

PATENTED JUN29 1971 3,589,447
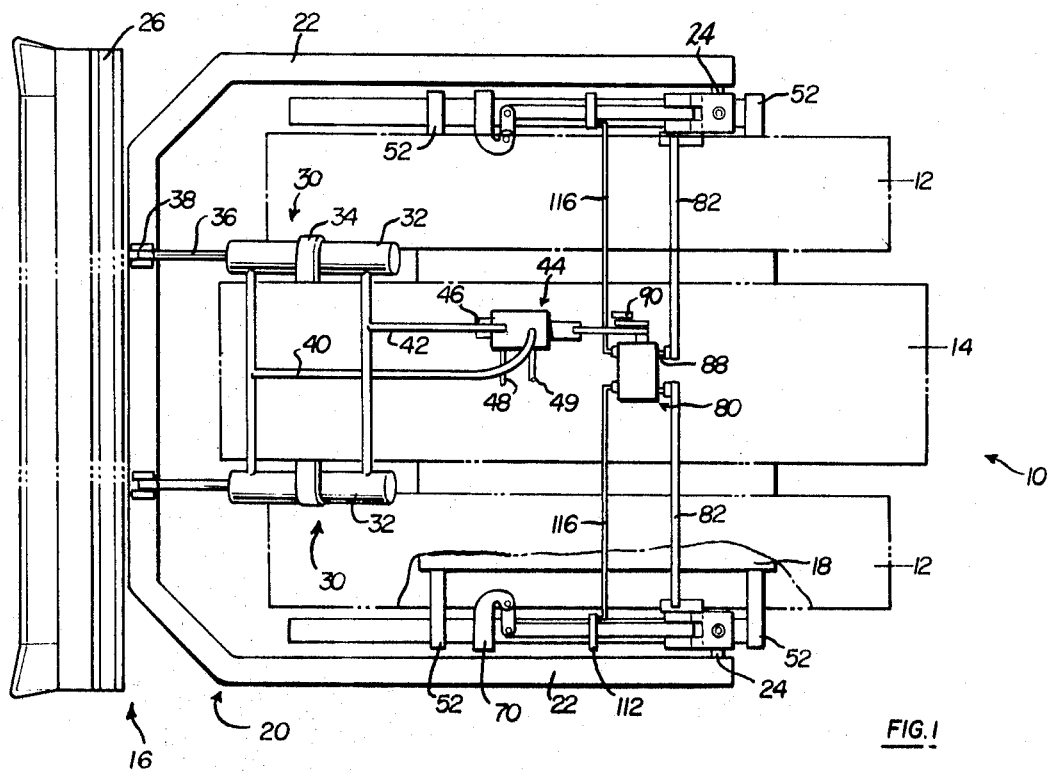
FIG. 1
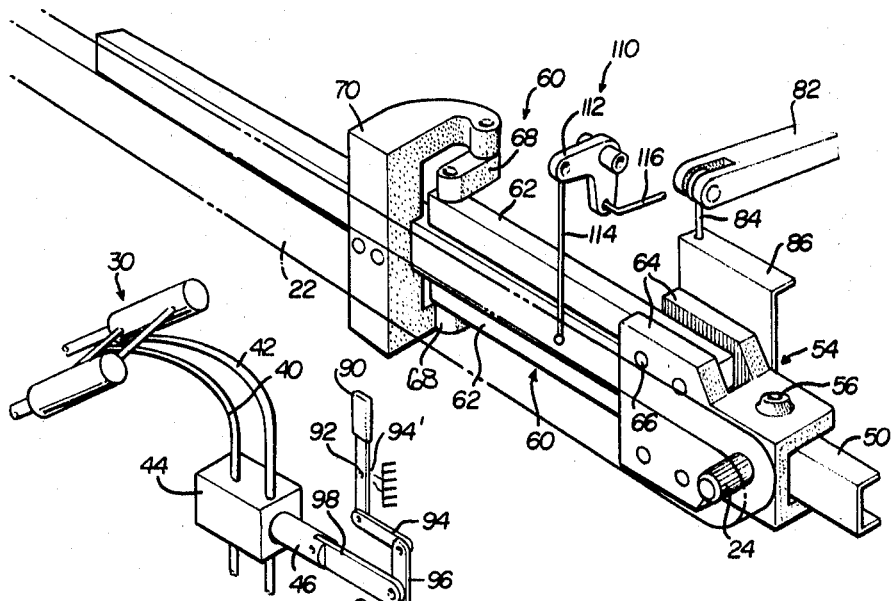
FIG. 2
FIG. 3
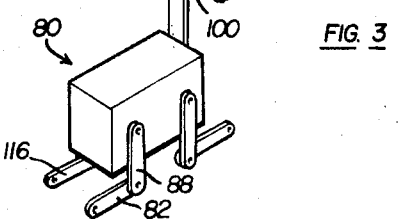
INVENTOR.
D H. SEABERG.
BY
SETTLE, BATCHELDER & OLTMAN.
ATT'YS

CONTROL SYSTEM FOR DOZER

BACKGROUND OF THE INVENTION

The present invention relates generally to earth-working implements and more particularly to an apparatus for automatically controlling the operation of earth-working equipment so as to provide maximum efficiency in the utilization of such equipment.

In the operation of convention earth-working machinery, such as bulldozers, the operator continually tries to maintain a position of the bulldozer blade which results in maximum efficiency of the machine. Also, many times it is desirable that the position of the blade remain at a predetermined position with respect to the vehicle. At other times, it is desirable to have a combination of the above features in which the position of the bulldozer blade should be maintained at a predetermined position and the draft load applied to the tool remain at a substantially constant level so as to maintain maximum efficiency of the machine.

Heretofore, very little effort has been devoted to maintaining maximum utilization of earth-working equipment, such as bulldozers, and the majority of the control of the equipment has been dependent upon the dexterity of the operator.

Thus, it has been fairly conventional to maintain a predetermined position of the bulldozer blade with respect to the vehicle by the manual manipulation of the controls by the operator of the vehicle. Also, it has been common practice to control the magnitude of the load applied to the blade and thus the vehicle by manual manipulation of the controls which raise and lower the implement or blade with respect to the vehicle.

Of course, such arrangement is not entirely satisfactory, since many times the operator needs both hands in order to properly control the direction and the speed of movement of the vehicle.

SUMMARY OF THE INVENTION

The present invention alleviates all of the above-mentioned shortcomings of the prior art type of devices by providing a simple and efficient manner of automatically controlling the load and/or position applied to an earth-working tool by load and position sensing mechanisms which produce output signals that are integrated into a single signal that controls the raised and lowered position of the implement with respect to the vehicle.

Thus, the primary object of the present invention is to provide means for automatically positioning an earth working tool in response to increases and decreases in load applied to the tool.

Another object is to provide a load and position control mechanism which automatically maintains a predetermined load on the tool as well as a predetermined position of the tool with respect to the propelling vehicle.

Other objects of this invention will appear in the following description and appended claims reference being had to the accompanying drawings forming a part of this specification wherein like reference characters designate corresponding parts in the several views.

AS SHOWN ON THE DRAWINGS

FIG. 1 shows a plan view of an earth-working tool attached to a propelling mechanism with the present invention incorporated therein;

FIG. 2 is an enlarged prospective view of the load-sensing mechanism of the present invention; and FIG. 3 is a schematic perspective view of part of the control mechanism of the present invention.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in FIG. 1, the present invention is incorporated in a tractor 10 having endless driven tracks 12 on opposite sides of a main frame 14 and carrying a blade assembly 16. A track supporting frame 18 extends from each side of the main frame 14 and supports the driven track suspension system as well as the blade assembly.

The bulldozer blade assembly 16 is of the conventional type and includes a substantially U-shaped supporting frame 20 having arms 22, the free ends of which are pivoted on a pivot pin 24 so that the blade 16 carried by frame 20 is adapted to be raised and lowered with respect to the forward end of the vehicle. Conventionally, the raising and lowering of the blade 26 with respect to the vehicle or tractor 10 includes a pair of hydraulic cylinder assemblies 30 each having a cylinder 32 pivotally supported on the frame 14 by a trunnion 34 and a piston rod 36 pivotally connected by a bracket 38 to the base portion of the U-shaped frame 20. Pressured fluid is selectively supplied to opposite ends of the cylinders 32 through conduits 40 and 42 by appropriate actuation of a control valve 44 having a valve spool 46 slidable in opposite directions from a neutral position. Of course, the valve 44 is connected to a pressure fluid source (not shown) of the vehicle by a first conduit 48 and to a sump or drain (not shown) by conduit 49.

According to the present invention, means are provided for automatically maintaining a predetermined load on the dozer blade or earth-working tool. Also, the present invention incorporates mechanism for automatically maintaining the blade 26 in a predetermined adjusted position with respect to the frame 14 and/or the endless tracks 12.

The load control mechanism of the present invention includes a simple and efficient mounting mechanism for mounting the free ends of the arms 22 on the frames 18 forming part of the frame 14 of the vehicle. The load-sensing mechanism of the present invention is more clearly shown in FIG. 2 and includes a channel or beam 50 fixedly secured at opposite ends by brackets 52 to the frame 18. The pivot pin 24 is defined on mounting means or a bracket 54 pivotally supported by pivot pin 56 on the channel or beam 50. Thus, the bracket 54 allows for relative movement of the pivot pin or axis 24 with respect to the vehicle 10.

The load-sensing mechanism or means further includes restraining means 60 which are interposed between the mounting means or bracket and the vehicle for restraining the movement of the bracket or mounting means 54 about the vertical pivot axes defined by pivot pin 56. In the illustrated embodiment, the restraining or biasing means 60 includes a pair of elongated spring bars or members 62 each having one end thereof fixedly secured to the bracket or mounting means 54, as by being interposed between a pair of lugs 64 and fixedly retained therebetween by pins 66. The opposite or free ends of each of the spring members are pivotally connected to one end of a link 68 and the opposite ends of the links 68 are pivotally connected to a bracket or member 70 carried by the channel or member 50. Thus, it will be seen that the elongated spring members 62 will tend to maintain the mounting means or bracket 54 in a predetermined position which defines the no-load position of the bracket on the vehicle. Of course, as the bracket tends to rotate in a counterclockwise direction on the pivot pin 56, which is caused by a load applied to the blade 26, the spring force of springs 62 will increase and will tend to return the bracket 54 to its original position. Thus, the pivotal movement of the mounting means 54 about pivot pin 56 will be a function of changes of draft load on the dozer blade or tool 26.

The changes in draft load applied to the working tool 26 are transmitted to a control mechanism or means 80 for generating a signal which is proportional to the measured movement or pivoting of the bracket 54 about the axis 56. This is accomplished by a link 82 pivotally connected to a rod 84 supported on a plate 86 fixedly secured to the bracket 54. The opposite end of the link 82 is connected to a member 88 extending from the mechanism 80. The mechanism 80 may take a variety of forms and need only translate the signal transmitted through the link 82 to a rectilinear movement for shifting the valve spool 46 in the appropriate direction. By way of example and not of limitation, the mechanism 80 may include linear variable differential transformers of the type disclosed in application Ser. No. 711,444, filed Mar. 7, 1968 or the wedge mechanism disclosed in U.S. Pat. No. 3,403,736, both assigned to the assignee of the present invention.

Alternatively, the mechanism 80 may be in the form of a linkage system or a differential gear mechanism which translates the signal received from the link 82 into an appropriate signal for shifting the valve spool.

The control mechanism of the present invention, further includes a manual control member or lever 90 for manually shifting the valve spool in opposite directions from the neutral position to selectively supply pressured fluid to opposite ends of the cylinder assemblies 30 thereby raising and/or lowering the blade 26 with respect to the vehicle or tractor 10 and defining a predetermined load and/or position of the blade. As schematically illustrated in FIG. 3, the lever 90 is pivoted intermediate its ends on a pivot pin 92 with an appropriate friction device 94' associated therewith to maintain the lever in any desired selected position. The opposite end of the lever is connected through a link 94 to a second link 96 which in turn is fulcrumed intermediate its ends on a link 98 having its free end connected to the valve spool. The opposite end of the link 96 is connected by a link 100 to the output signal from the mechanism 80 which is transmitted through a member 102. As will become apparent hereinafter, the lever 90 may be utilized for selecting a desired position and/or desired load on the blade 26.

The position-sensing mechanism includes means 110 for measuring changes of the position of the arms 22 with respect to the pivot pin 24. The means 110 is illustratively shown as a bellcrank 112 pivotally supported on the frame structure 18 of the vehicle 10 with one arm of the bellcrank connected by a rod 114, or other suitable device, to the arm 22 at a point spaced from the pivot pin or axis 24. The opposite arm of the bellcrank 112 is connected through link or rod 116 to an input member 118 forming part of the mechanism 80. Again, the mechanism 80 incorporates suitable means for transmitting the signal received from the member 118 as an output signal to the member 102 and subsequently to the valve spool 46.

As can readily be appreciated, when both position and draft control are being automatically controlled by the mechanism of the present invention, the means or mechanism 80 combines the respective signals of the position of the draft arms with respect to the vehicle and the load signal into a single integrated output signal which is supplied to the valve spool 46. Again as an example, this may be accomplished by a device of the type disclosed in the above-mentioned copending application.

OPERATION

While the operation of the present invention is disclosed in the above description, a brief resume at this point appears to be in order.

The manual control lever 90 is positioned to define a predetermined load on the blade or tool 26 by the ground being worked. Movement of the manual control lever 90 will cause a pivotal movement of the link 96 about its lower free end connected to the link 100, which at this time is in a fixed position. This of course will actuate the valve spool to supply pressured fluid to the cylinders 32. Once the predetermined load is supplied to the tool, the valve spool will be caused to move to the neutral position. This of course is accomplished by having the link 96 pivot about the pivotal connection to the link 94 which is now in the fixed position and the movement is created by a signal received from the load-sensing means 82—86 to the control mechanism 80.

Once the predetermined load is achieved, an equilibrium condition will be reached in the links connected to the valve spool 46 and the valve spool will be in the neutral position. Of course, any changes in magnitude of load applied to the tool will cause a corresponding change in the pivoted position of the bracket 54 on pivot pin 56 and the change in position will be transmitted by the sensing means and control mechanism to the linkage connected to the valve spool to shift the valve spool and cause an appropriate repositioning of the tool on the vehicle.

The position control device operates in substantially the same manner. Thus, the position of the manual control lever 90 will define a predetermined equilibrium position for the sensing means 110 connected to the arms 22. Any changes of position of the blade 26 and arms 22 will be transmitted through sensing means 110 and control means 80 to actuate the valve spool.

Of course, either the position control or the load control mechanism may be rendered ineffective to thereby provide a single control of either position control or load control. This may be accomplished by, among other means, disconnecting the respective links 82 and 116 from the plates 86 and arms 22.

As can be appreciated from the above description, the present invention provides a simple and efficient manner of controlling the position of an earth-working tool with respect to a vehicle and/or the load applied to the tool. The entire device is automatic in operation after a predetermined setting has been made by the operator. This of course frees the operator completely for other necessary activities.

I claim:

1. In combination with an earth-working tool having a pair of arms with free ends thereof pivotally connected to a vehicle along horizontal pivot axes and power means for raising and lowering said tool on said vehicle and including motor means and valve means selectively actuating said motor means to pivot said arms on said pivot axes, the improvement of load-sensing means interposed between the pivotal connection of at least one of said arms and said vehicle, said load-sensing means including bracket means defining a vertical pivot axis on said vehicle and pivotally supporting the horizontal pivot axis of said one of said arms, means defining a first position for said bracket means corresponding to a predetermined load on said tool, means for sensing pivotal movement of the horizontal pivot axis about said vertical pivot as a function of changes in load on said tool, and means generating a signal as a function of said pivotal movement for actuating said valve means hereby to raise or lower said tool on said vehicle.

2. Apparatus for controlling the magnitude of load exerted on an earth-working tool pivotally supported on a transverse pivot axis of a longitudinally extending frame, comprising mounting means movably supporting said transverse axis on a vertical pivot axis on said frame, restraining means interposed between said mounting means and said frame for maintaining said mounting means in a predetermined position on said frame corresponding to a predetermined load on said tool, means for measuring movement of said transverse pivot axis about said vertical pivot axis as a function of changes in load on said tool, and means for generating a signal proportional to the measured movement of said transverse pivot axis for actuating mechanism to pivot said tool on said transverse pivot axis and thereby maintain said predetermined load on said tool.

3. Apparatus as defined in claim 2, in which said restraining means includes an elongated spring member having opposite ends with one end connected to said mounting means and a link pivotally supported on said opposite end and said frame for restraining movement of said opposite end.

4. Apparatus for sensing changes in load on a tool supported by a free end of an arm on a frame, comprising a bracket having said tool pivotally supported thereon about a first pivot axis, means defining a second pivot axis on said frame and perpendicular to said first pivot axis with said bracket pivotally supported thereon, an elongated spring bar having opposite ends with one end connected to said bracket at a connection spaced from said second pivot axis and link means having opposite ends respectively pivotally connected to the other end of said spring bar and said frame whereby a predetermined load on said tool causes said bracket to pivot about said second pivot axis to a first position and changes in load on said tool will pivot said bracket about said second pivot axis as a function of changes in load on said tool.

5. In combination with an earth-working tool having a pair of arms the free ends of which are pivotally connected to a vehicle along a pair of vertical and horizontal pivot axes and power means for raising and lowering said tool on said vehicle including motor means and valve means selectively actuating said motor means to pivot said arms on said horizontal pivot axes, the improvement of load and position sensing means interposed between a pair of pivot axis of at least one of said arms and said vehicle, said load-sensing means including mechanism allowing relative movement of said at least one arm around said vertical pivot axis on said vehicle as a function of increased load on said tool, means establishing a first position of said mechanism corresponding to a selected position and predetermined load on said tool by actuation of said valve means, first means for generating a first signal as a function of movement of said mechanism from said first position, second means for generating a second signal as a function of movement of said at least one arm around said horizontal pivot axis signal translating and integrating means having a single output interposed between said load and position sensing means and said valve means, said first and second signal-generating means being connected to said signal translating and integrating means, and third means connected between said output of said signal translating and integrating means and said valve means for actuating said valve means to reposition said tool whereby to maintain said selected position and said predetermined load on said tool.

6. The combination as defined in claim 5, in which said mechanism comprises a bracket supported on said vertical pivot axis perpendicular to said horizontal pivot axis of said at least one arms, and means connected between said bracket and said vehicle yieldably urging said mechanism into said first position.

7. The combination as defined in claim 5, in which said first, second and third means comprise independently controlled linkages and said means establishing a first position comprising a control lever connected to said valve means.

8. The combination as defined in claim 6, including the further improvement of said yieldable means comprising a spring member having one end fixedly connected to said bracket and the opposite end pivotally connected to said vehicle.

9. Apparatus for controlling the load and position of an implement pivotally supported on spaced pivot axes defined on a vehicle with hydraulic motor means operably to raise and lower said implement on said vehicle by pivoting said implement on said axes, valve means for controlling operation of said motor means and having a valve spool reciprocable in opposite directions from a neutral position to raise or lower said implement, comprising:

manual means cooperating with said valve spool and operable to define a predetermined position of said implement on said vehicle as well as a predetermined load on said implement, position-sensing means for measuring changes of the position of said implement from said predetermined position, load-sensing means controlling the magnitude of load applied to said implement, said load-sensing means including:
  a. mounting means pivotally supporting each pivot axis about a respective perpendicular pivot axis on said vehicle,
  b. restraining means interposed between each said mounting means and said vehicle for defining a position of said mounting means corresponding to a predetermined load applied to said implement, and
  c. means generating a first signal as a function of the magnitude of load applied to said implement;

said position sensing means including:
  a. a rod member having one end pivotally connected to said implement support,
  b. a motion-translating member connected to the other end of said rod member and pivotally supported on said vehicle,
  c. means generating a second signal as a function of the changed position of said implement from said predetermined position;

and signal receiving and integrating means disposed between said position and load-sensing means and said valve means to actuate said valve spool in response to the signals received from said first and second signal generating means.